(12) United States Patent
Kato et al.

(10) Patent No.: US 9,935,526 B2
(45) Date of Patent: Apr. 3, 2018

(54) ELECTRIC ROTATING MACHINE

(75) Inventors: Masaki Kato, Chiyoda-ku (JP); Masahiko Fujita, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 805 days.

(21) Appl. No.: 14/372,808

(22) PCT Filed: Apr. 16, 2012

(86) PCT No.: PCT/JP2012/060220
§ 371 (c)(1),
(2), (4) Date: Jul. 17, 2014

(87) PCT Pub. No.: WO2013/157066
PCT Pub. Date: Oct. 24, 2013

(65) Prior Publication Data
US 2014/0354087 A1   Dec. 4, 2014

(51) Int. Cl.
| | |
|---|---|
| *H02K 11/00* | (2016.01) |
| *H02K 11/04* | (2016.01) |
| *H02K 5/02* | (2006.01) |
| *H02K 9/06* | (2006.01) |
| *H02K 11/33* | (2016.01) |
| *H02K 5/08* | (2006.01) |
| *H02K 5/18* | (2006.01) |

(52) U.S. Cl.
CPC ............ *H02K 11/048* (2013.01); *H02K 5/02* (2013.01); *H02K 9/06* (2013.01); *H02K 11/046* (2013.01); *H02K 11/33* (2016.01); *H02K 5/08* (2013.01); *H02K 5/18* (2013.01)

(58) Field of Classification Search
CPC ..... H02K 11/048; H02K 11/049; H02K 11/05
USPC ............................................. 310/68 B, 68 D
See application file for complete search history.

(56) References Cited

U.S. PATENT DOCUMENTS

| | | | |
|---|---|---|---|
| 2003/0200761 A1 | 10/2003 | Funahashi et al. | |
| 2007/0228892 A1* | 10/2007 | Koyama | H01L 24/73 310/348 |

(Continued)

FOREIGN PATENT DOCUMENTS

| | | |
|---|---|---|
| CN | 101317318 A | 12/2008 |
| CN | 102026861 A | 4/2011 |

(Continued)

OTHER PUBLICATIONS

Communication dated Aug. 24, 2016, from the European Patent Office in counterpart European application No. 12 874 455.4.

(Continued)

*Primary Examiner* — Hanh Nguyen
(74) *Attorney, Agent, or Firm* — Sughrue Mion, PLLC; Richard C. Turner

(57) ABSTRACT

A power module composite includes a power module (34) in which switching devices (32) included in an electric-power conversion circuit are molded, a driver module (37) that includes a control circuit (35) for controlling the switching devices (32) and is molded, a housing (39) containing the power module (34) and the driver module (37), and a heat sink (38) that is fixed to the housing (39) and refrigerates the switching devices (32); the power module 34 and the driver module 37 are mounted in that order on the heat sink (38) in such a way as to be superimposed on each other.

17 Claims, 6 Drawing Sheets

(56) References Cited

U.S. PATENT DOCUMENTS

| | | | |
|---|---|---|---|
| 2008/0211331 A1 | 9/2008 | Dubuc et al. | |
| 2009/0243407 A1 | 10/2009 | Kato et al. | |
| 2011/0066332 A1 | 5/2011 | Sonoda et al. | |
| 2011/0101804 A1* | 5/2011 | Isoda | H02K 5/18 310/64 |
| 2011/0211980 A1 | 9/2011 | Shibuya et al. | |
| 2011/0254411 A1 | 10/2011 | Minato | |
| 2011/0273042 A1 | 11/2011 | Isoda et al. | |
| 2011/0285225 A1* | 11/2011 | Matsuda | B62D 5/0406 310/64 |
| 2012/0098391 A1* | 4/2012 | Yamasaki | B62D 5/0406 310/68 D |
| 2012/0181903 A1 | 7/2012 | Kato et al. | |
| 2013/0334934 A1* | 12/2013 | Maeda | H02K 11/0073 310/68 B |

FOREIGN PATENT DOCUMENTS

| | | |
|---|---|---|
| CN | 102203418 A | 9/2011 |
| CN | 102263071 A | 11/2011 |
| JP | 2008-543266 A | 11/2008 |

OTHER PUBLICATIONS

Communication dated Feb. 2, 2016 from the State Intellectual Property Office of the P.R.C. in counterpart application No. 201280070884.7.

Communication dated Mar. 22, 2016 from the European Patent Office in counterpart application No. 12874455.4.

Communication dated Aug. 18, 2016, from the State Intellectual Property Office of People's Republic of China in counterpart Application No. 201280070884.7.

International Search Report for PCT/JP2012/060220 dated May 7, 2013 [PCT/ISA/210].

Communication dated Aug. 23, 2017, from the European Patent Office in counterpart European application No. 12 874 455.4, 5 pages.

Office Action dated Apr. 12, 2017 from the European Patent Office in counterpart application No. 12 874 455.4.

Communication dated Nov. 24, 2017, from the European Patent Office in counterpart European Application No. 12874455.4.

Wikipedia, Electronic Packaging (https://en.wikipedia.org/wiki/Electronic_packaging) one page total.

* cited by examiner

ELECTRIC ROTATING MACHINE

CROSS REFERENCE TO RELATED APPLICATIONS

This application is a National Stage of International Application No. PCT/JP2012/060220 filed Apr. 16, 2012, the contents of all of which are incorporated herein by reference in their entirety.

TECHNICAL FIELD

The present invention relates to an electric rotating machine in which a control apparatus for controlling the electric rotating machine is mounted.

BACKGROUND ART

To date, there has been known an electric rotating machine in which a control apparatus for the electric rotating machine is mounted in the electric rotating machine main body; the control apparatus mounted in the electric rotating machine main body is configured with a power module composite having an electric-power conversion circuit that converts DC electric power into AC electric power or vice versa, a magnetic-field circuit unit that supplies a magnetic-field current to the magnetic-field winding of the electric rotating machine, and a control circuit unit that controls the power module composite and the magnetic-field circuit unit; the control apparatus is disposed behind the rear bracket of the electric rotating machine.

With regard to the configuration of the power module composite of the foregoing control apparatus, the electric-power conversion circuit is formed of an electronic power component such as a switching device, of an MOSFET or the like, that is disposed in a box-type housing having a top face, a bottom face, and both side faces, and an electric power connection unit that is connected with the switching devices through wire bonding and is integrally molded with the housing; a control element formed of an ASIC (integrated circuit) that controls the switching device is also disposed inside the housing. The inside of the housing is sealed by a gel-like protection gel, made of a silicon resin or an epoxy resin, that works also for insulation and mechanical protection (e.g., Patent Document 1).

PRIOR ART REFERENCE

Patent Document

[Patent Document 1] National Publication of International Patent Application No. 2008-543266

DISCLOSURE OF THE INVENTION

Problems to be Solved by the Invention

In a conventional electric rotating machine disclosed in Patent Document 1, the switching device of the power module, electronic components such as an ASIC and the like, and the wire bonding portion connected with the switching device are sealed with a protection gel, as described, above; however, due to vibration caused by operation of the electric rotating machine, the wire bonding portion may be disconnected, and the switching device and the electronic components such as an ASIC and the like have a low vibration resistance; thus, there has been a problem that the reliability of the power module composite is low.

Moreover, there has been a problem that because being arranged on approximately the same plane, the foregoing electronic components require a large mounting area and hence the power module composite is upsized.

The present invention has been implemented in order to solve the foregoing problems in a conventional electric rotating machine; the objective thereof is to obtain an electric rotating machine equipped with a control apparatus including a power module composite that raises the vibration resistance thereof so as to enhance the reliability thereof and that can be downsized.

Means for Solving the Problems

An electric rotating machine according to the present invention is provided with a rotor fixed on the rotor shaft, a stator that is disposed in such a way as to face the rotor and is provided with a stator winding, a case that pivotably supports the rotor shaft and holds the stator, and a control apparatus that is fixed to the case and has a power module composite provided with an electric-power conversion circuit that performs electric-power conversion between the stator winding and an external DC power source and a control apparatus having a control circuit unit that controls the electric-power conversion circuit; the electric rotating machine is characterized in that the electric-power conversion circuit provided in the power module composite is controlled by the control circuit unit so as to convert DC power from an external DC power source into AC power and supply the AC power to the stator winding or so as to convert AC power generated across the stator winding into DC power and supply the DC power to the DC power source, in that the power module composite has a power module in which switching devices included in the electric-power conversion circuit are molded with an insulating resin, a driver module that is molded with an insulating resin and includes a control circuit for controlling the switching devices, a housing containing the power module and the driver module, and a heat sink that is mounted in the housing and refrigerates the switching devices, and in that the power module and the driver module are mounted on the heat sink in such a way that the driver module is superimposed on the power module that is closer to the heat sink than the driver module is

Advantage of the Invention

In the electric rotating machine according to the present invention, the power module composite has a power module in which switching devices included in the electric-power conversion circuit are molded with an insulating resin, a driver module that is molded with an insulating resin and includes a control circuit for controlling the switching devices, a housing containing the power module and the driver module, and a heat sink that is mounted in the housing and refrigerates the switching devices, and the power module and the driver module are mounted on the heat sink in such a way that the driver module is superimposed on the power module that is closer to the heat sink than the driver module is. As a result, because the wire bonding portion is not broken when the electric rotating machine 1 is operated, the vibration resistance of the power module composite is raised and hence the reliability is enhanced; thus, furthermore, an electric rotating machine can be obtained in which the power module composite is downsized.

BEST MODE FOR CARRYING OUT THE INVENTION

Embodiment 1

Figure 1:
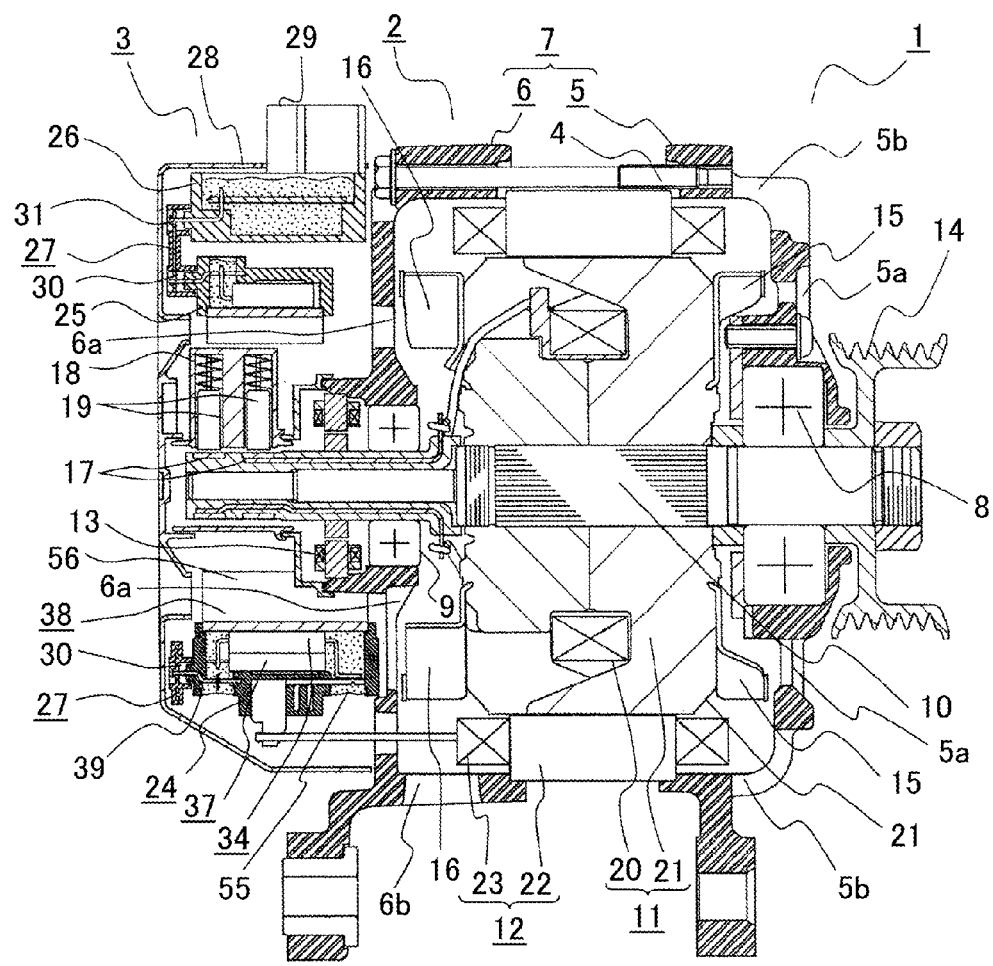
FIG. 1 is a cross-sectional view of an electric rotating machine according to Embodiment 1 of the present invention.
Figure 2:
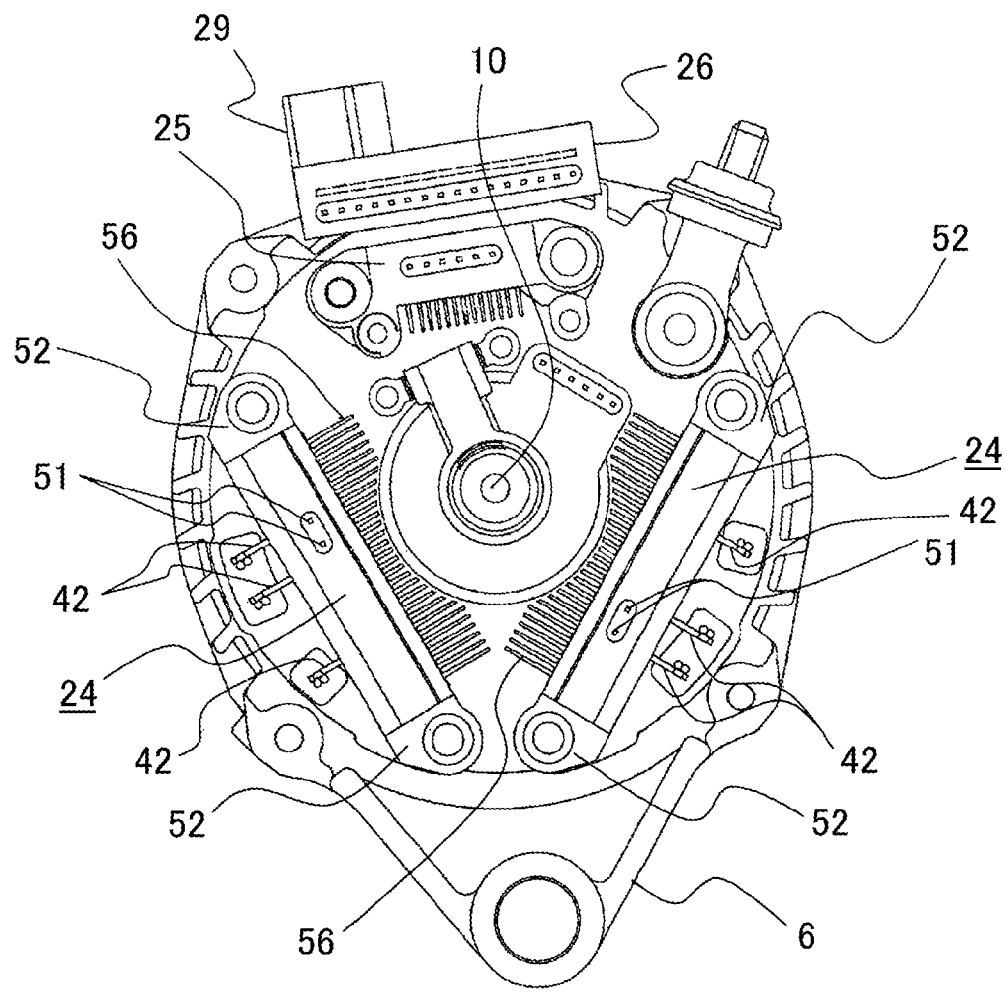
FIG. 2 is a front view illustrating the state of the electric rotating machine according to Embodiment 1 of the present invention, when viewed from the rear bracket before the cover and a signal relay unit thereof have been mounted.

Hereinafter, an electric rotating machine according to Embodiment 1 of the present invention will be explained with reference to the drawings. In each of the drawings, an after-mentioned insulating resin is simplified for the sake of convenience. FIG. 1 is a cross-sectional view of an electric rotating machine according to Embodiment 1 of the present invention; FIG. 2 is a front view illustrating the state of the electric rotating machine according to Embodiment 1 of the present invention, when viewed from the rear bracket before the cover and a signal relay unit thereof have been mounted. In the following description, the explanation will be made with reference to the drawings, in each of which the same or similar constituent members and elements are designated by the same reference numerals.

In FIGS. 1 and 2, an electric rotating machine 1 according to Embodiment 1 is a controller-integrated electric rotating machine having an electric rotating machine main body 2 and a control apparatus 3 mounted on the electric rotating machine main body 2; each of FIGS. 1 and 2 illustrates a case where the electric rotating machine 1 is an AC motor generator. The electric rotating machine main body 2 is provided with a case 7 formed of a front bracket 5 and a rear bracket 6 that are integrated with each other by use of two or more bolts 4, a rotor shaft 10 that is held by bearings 8 and 9 supported by the case 7 and whose both ends protrude from the case 7, a rotor 11 that is coaxially fixed on the rotor shaft 10 in the case 7 and rotates along with the rotor shaft 10, a stator 12 that is held by the inner circumferential surface of the case 7 in such a way as to cover the outer circumference of the rotor 11, a rotation-position detection sensor 13 that is mounted on one end of the rotor shaft 10 and detects the rotation angle of the rotor 11, and a pulley 14 fixed on the other end of the rotor shaft 10.

The electric rotating machine main body 2 is also provided with centrifugal fans 15 and 16 mounted on both respective ends of the rotor 11, a pair of slip rings 17 that are fixed to one axis-direction end of the rotor shaft 10 and supply a current to an after-mentioned rotor winding 20, and a pair of brushes 19 that are contained in a brush holder 18 supported by the case, in such a way as to slidably make contact with the respective slip rings 17.

The front bracket 5 and the rear bracket 6 included, by the case 7 are made of metal and are approximately bowl-shaped. A through-hole that makes the inside and the outside of the electric rotating machine main body 2 communicate with each other is formed at both the respective middle portions, in the axis direction of the rotor shaft 10, of the front bracket 5 and the rear bracket 6; the rotor shaft 10 penetrates the through-hole. The rotor shaft 10 is pivotably supported by the bearings 8 and 9.

Two or more air inlets 5a and two or more air inlets 5a are formed in the respective bottom portions of the approximately bowl-shaped front bracket 5 and rear bracket 6; similarly, two or more air outlets 5b and two or more air outlets 6b are formed in the respective outer-circumference both-shoulder portions.

The rotor 11 is configured with a rotor winding 20 that generates magnetic flux when a current flows therethrough and a pair of rotor iron cores 21 that are fixed on the rotor shaft. 10, around which the rotor winding 20 is wound, in which the magnetic flux generated through the rotor winding 20 forms magnetic poles. The pair of rotor iron cores 21 is made of iron; eight claw-shaped magnetic poles are provided in the circumferential direction thereof on the circumferential edge thereof at an equal-angle pitch in such a way as to protrude in the axis direction of the rotor shaft 10; the pair of rotor iron cores 21 is fixed on the rotor shaft 10 in such a way that the claw-shaped magnetic poles are engaged with each other.

The stator 12 provided in such a way as to surround the rotor 11 is provided with a stator iron core 22 that is fixed on each of the front bracket 5 and the rear bracket 6 and a stator winding 23 wound around the stator iron core 22. The stator winding 23 is configured with two three-phase AC windings that are each formed through star connection. A communication belt (unillustrated) that works in conjunction with the rotation axle of an engine (unillustrated) is wound around the pulley 14 fixed to the end, in the vicinity of the front bracket 5, of the rotor shaft 10; through the communication belt, the pulley 14 is coupled with the rotation axle of the engine.

The control apparatus 3 is provided with two power module composites 24 electrically connected with the stator winding 23, a magnetic-field circuit unit 25 that adjusts DC power from a battery (unillustrated) as a DC power source and supplies a magnetic-field current to the rotor winding 20, a control circuit unit 26 that controls the power module composite 24 and the magnetic-field circuit unit 25, and a signal relay unit 27 that performs trans fission and reception of control signals among the power module composite 24, the magnetic-field circuit unit 25, and the control circuit unit 26. The control apparatus 3 is supported by the rear bracket 6 and is enclosed by a cover 28 formed of an insulating resin.

A signal from the rotation-position detection sensor 13 is transmitted to the control circuit unit 26 by way of the signal relay unit 27. The control circuit unit 26 is provided with a leading-to-outside connector 29 that performs transmission and reception of a signal with an external apparatus (e.g., an engine control unit or the like). Based on respective information items obtained from external apparatuses and the rotation-position detection sensor 13, the control circuit unit 26 controls the magnetic-field circuit unit 25 and the power module composite 24.

The magnetic-field circuit unit 25 is controlled by the control circuit unit 26 so as to adjust the magnetic-field current for the rotor winding 20. The magnetic-field current that has been adjusted by the magnetic-field circuit unit 25 is supplied to the rotor winding 20 of the rotor 11, thereby generating a DC magnetic field in the rotor 11.

The power module composite 24 is controlled by the circuit unit 26 so as to work as a converter that converts AC power received from the stator winding 23 into DC power and then supply the DC power to the battery or a vehicle apparatus or so as to work as an inverter that converts DC power from the battery into AC power and then supply the AC power to the stator winding 23.

The signal relay unit 27 has a signal relay member 30 electrically connected with the power module composite 24 and the magnetic-field circuit unit 25 and a signal relay connection unit 31 that is provided in the signal relay member 30 and is connected with the control circuit unit 26. The transmission and reception of signals among the power module composite 24, the magnetic-field circuit unit 25, and the control circuit unit 26 are performed by way of the signal relay unit 27.

As illustrated in FIGS. 1 and 2, the power module composite 24, the magnetic-field circuit unit 25, and the control circuit unit 26 are arranged around the rotor shaft 10 and are fixed on the outer surface of the rear bracket 6. Although not illustrated, the control circuit unit 26 is electrically connected with the power module composite 24 and the magnetic-field circuit unit 25, by use of a connector.

Figure 3:
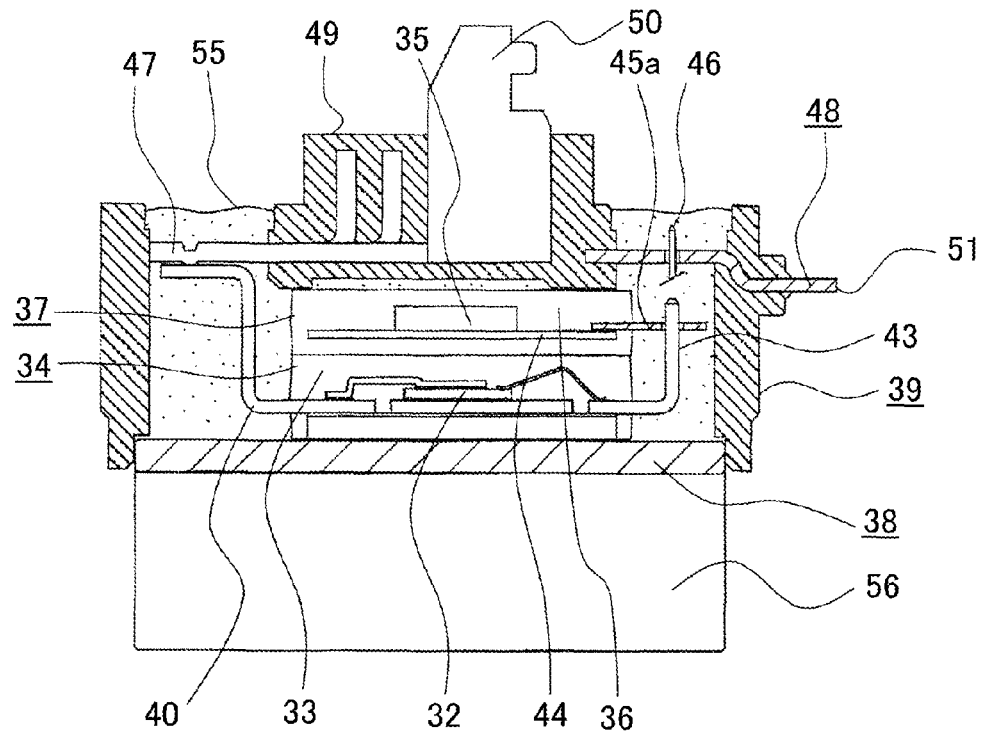
FIG. 3 is a cross-sectional view of a power module composite in the electric rotating machine according to Embodiment 1 of the present invention.

Next, the structure of the power module composite 24 will be explained. FIG. 3 is a cross-sectional view of the power module composite in the electric rotating machine according to Embodiment 1 of the present invention. In FIG. 3, the power module composite 24 is configured with a power module 34 in which a switching device 32 formed of an MOSFET is molded with an insulating resin 33, a driver module 37 in which an integrated circuit 35, which is formed of an ASIC and works as a control circuit for controlling the switching device 32, is molded with an insulating resin 36, a heat sink 38 for cooling the switching device 32, and a housing 39 for fixing the power module 34, the driver module 37, and the heat sink 38.

The heat sink 38 closes one-end opening portion of the housing 39; the peripheral portion of the heat sink 38 is adhered and fixed to the inner wall of the one-end opening portion. Two or more fins 56 are provided on the surface, of the heat sink 38, that is the distal side thereof with respect to the housing 39; the fins 56 protrude from the surface toward the outside of the housing 39.

Figure 4:
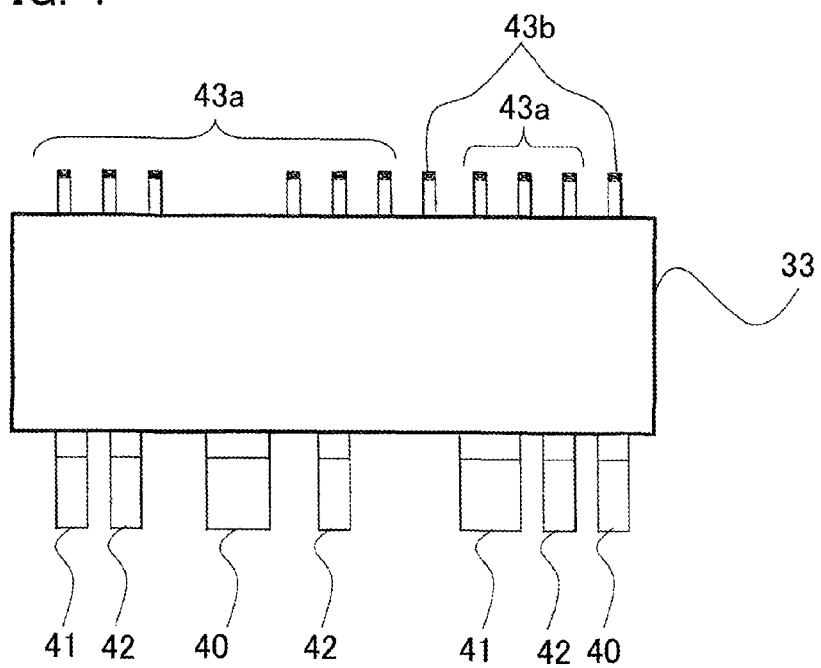
FIG. 4 is a plan view of a power module in the electric rotating machine according to Embodiment 1 of the present invention.
Figure 5:
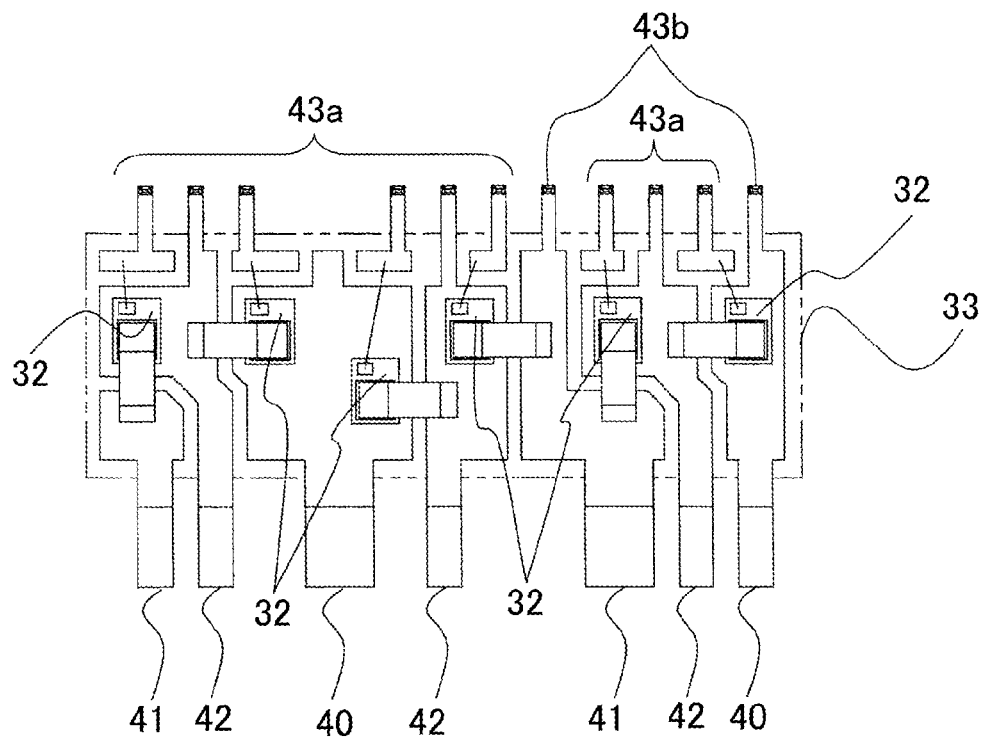
FIG. 5 is a configuration diagram representing the internal structure of a power module in the electric rotating machine according to Embodiment 1 of the present invention.

FIG. 4 is a plan view of the power module in the electric rotating machine according to Embodiment 1 of the present invention FIG. 5 is a configuration diagram representing the internal structure of the power module in the electric rotating machine according to Embodiment 1 of the present invention. The power module 36 illustrated in each of FIGS. 4 and 5 forms a three-phase bridge circuit as the three-phase electric-power conversion circuit. In each of FIGS. 4 and 5, the power module 34 includes six switching devices 32 that are included in the respective upper arms and lower arms for three phases of the electric-power conversion circuit; positive terminals 40, which are terminals electrically connected with the battery; negative terminals 41, which are terminals electrically connected with the around; AC terminals 42, which are power-source terminals electrically connected with the stator winding 23; and two or more signal terminals 43a and 43b, which are terminal through which control signals are inputted to the switching device 32. A temperature sensor (unillustrated) for the switching device 32 is included in the signal terminals 43a and 43b; the positive terminals 40, the negative terminals 41, and the AC terminals 42 are include in the power-source terminals.

Figure 6:
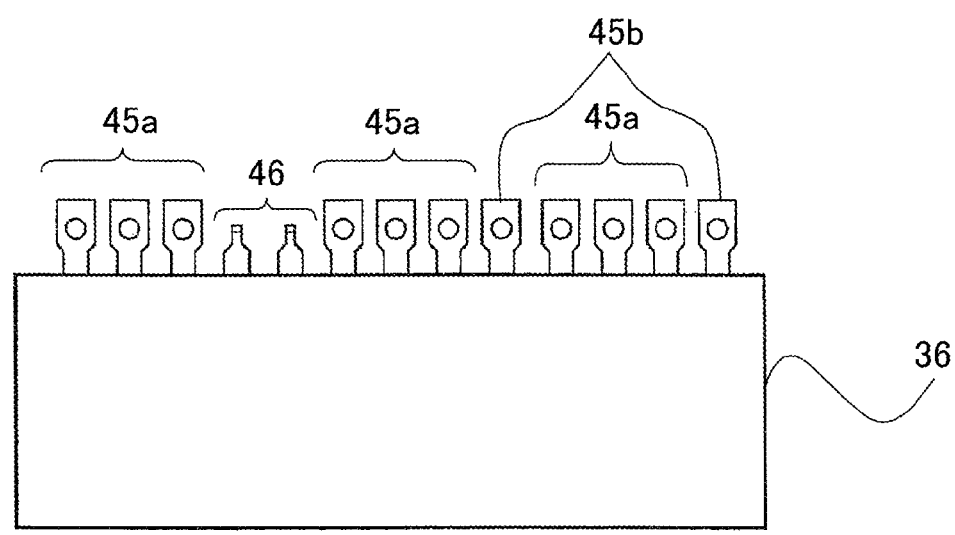
FIG. 6 is a plan view of a driver module in the electric rotating machine according to Embodiment 1 of the present invention.

As well illustrated in FIGS. 3, 4, and 6, the terminals 41, 42, 43, and 44 are arranged on the same plane in such a way as to be spaced apart from one another.

As illustrated in FIG. 5, the two positive terminals 40, the two negative terminals 41, the three AC terminals 42, the two or more signal terminals 43a and 43b are arranged spaced apart from one another. The spaces among these terminals are filled with the insulating resin 33 so that the terminals are insulated from one another. A described above, the electrodes of the six switching devices 36 are electrically connected, through soldering or the like, with the respective corresponding terminals 40, 41, 42, 43a, and 43b and are integrally molded with the insulating resin 33 so as to be integrally fixed.

The positive terminal 40, the negative terminal 41, the AC terminal 42 are pulled out through one side face of the insulating resin 33 having an approximately quadrangular shape and are bent in an approximately L-shaped manner; the signal terminals 43a and 43b are pulled out through the other side face, of the insulating resin 33, that faces the one side face through which positive terminal 40, the negative terminal 41, the AC terminal 42 are pulled out, and are bent in an approximately L-shaped manner.

Figure 7:
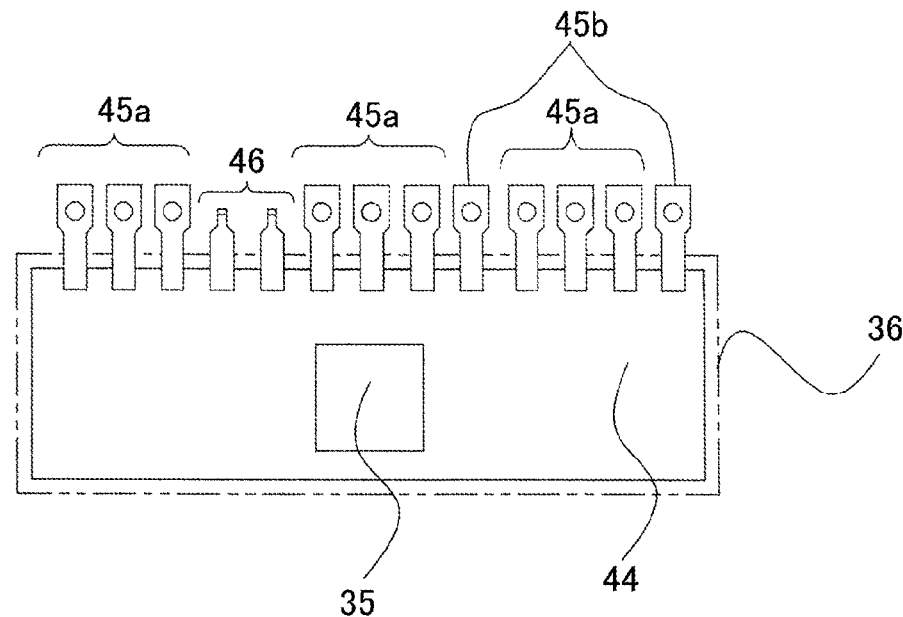
FIG. 7 is a configuration diagram representing the internal structure of the driver module in the electric rotating machine according to Embodiment 1 of the present invention.

FIG. 6 is a plan view of the driver module in the electric, rotating machine according to Embodiment 1 of the present invention. FIG. 7 is a configuration diagram representing the internal structure of the driver module in the electric rotating machine according to Embodiment 1 of the present invention. In each of FIGS. 6 and 7, the driver module 37 is an element for controlling the switching device 32 of the power module 34; in the driver module 37, the integrated circuit 35 packaged through molding is mounted on a multi-layer substrate 44 such as a glass-epoxy substrate, and these members are molded with an insulating resin 36 having an approximately quadrangular shape.

The driver module 37 is provided with signal terminals 45a and 45b electrically connected with the respective corresponding signal terminals 43a and 43b of the power module 34. The signal terminals 45a and 45b of the driver module 37 are pulled out through one side face of the insulating resin 36; the one side face is situated at the same side as the side face through which the signal terminals 43a and 43b of the power module 34 are pulled out; moreover, the terminal arrangement of the signal terminals 45a and 45b of the driver module 37 pulled out from the insulating resin 36 are the same as the terminal arrangement of the signal terminals 43a and 43b of the power module 34 pulled out from the insulating resin 33.

The driver module 37 is provided with signal terminals 46 electrically connected with the housing 39; in Embodiment 1, the signal terminals 46 are also pulled out through the one side face through which the signal terminals 45a and 45b are pulled out from the insulating resin 36.

Figure 8:
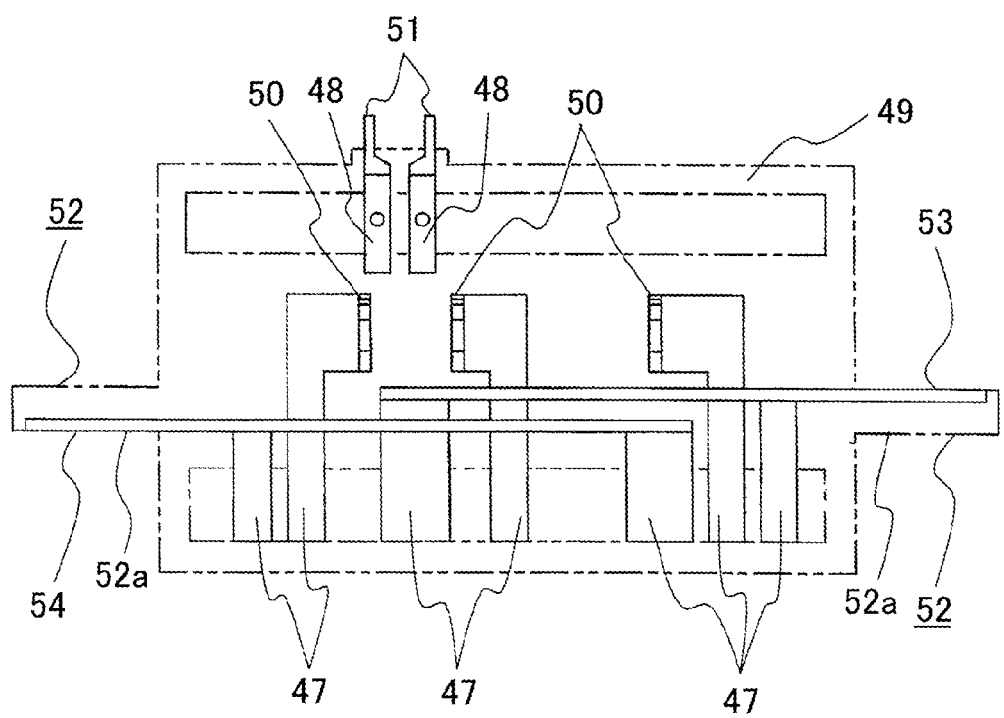
FIG. 8 is a configuration diagram representing the internal structure of the housing of the power module composite in the electric rotating machine according to Embodiment 1 of the present invention.

FIG. 8 is a configuration diagram representing the internal structure of the housing of the power module composite in the electric rotating machine according to Embodiment 1 of the present invention. The housing 39 has opening portions at both ends thereof; electric power connection members 47 to be electrically connected with the positive terminals 40, the negative terminals 41, and the AC terminals 42 of the power module 34 and signal connection members 48 to be electrically connected with the signal terminals 46 of the driver module 37 are integrally insertion-molded with an insulating resin 49; inputs and outputs er signals are extracted from the housing 39.

The electric power connection members 47 and the signal connection members 48 are arranged along the-other-end opening portion, of the housing 39, that is at the side opposed to the side on which the heat sink 38 is mounted). Moreover, when viewed from a direction in which the driver module 37 is superimposed on the power module 34, the electric power connection members 47 are disposed at positions where the positive terminals 40, the negative terminals 41, and the AC terminals 42 of the power module 34 are superimposed on the electric power connection members 47, and the signal connection members 48 are disposed at positions where the signal terminals 43a, 43b, 45a, 45b, and 48 are superimposed on the signal connection members 40.

AC connection portions 50 of the electric power connection members 47, which are electrically connected with the AC terminals 42, are pulled, out through the other end of the housing 39 toward the outside of the housing 39.

Furthermore, as illustrated in FIGS. 1 and 3, a connection portion 51 to be electrically connected with the signal relay member 30 in the signal connection member 48 is pulled out from the insulating resin 49 toward the outside; in addition, as illustrated in FIG. 2, the connection portions 51 (in Embodiment 1, two portions) pulled out from the insulating resin 49 are disposed in such a way as to be aligned on a straight line along the rotor shaft 10.

A pair of flange portion 52 for mounting the power module composite 24 on the rear bracket 6 is formed in the outer structural portions other than the one end (on the side face of which the heat sink 38 is mounted) of the housing 39 and the other end (the side face opposed to the foregoing side face on which the heat sink 38 is mounted) thereof. In the flange portion 52, a mounting face 52a that is perpendicular to the rotor shaft 10 is formed. Furthermore, a connection portion 53 and a connection portion 54, which are the respective ends of the electric power connection members 47 pulled out toward the outside of the housing 39 and have the same electric potential as the battery and the same electric potential as the ground, respectively, are formed in such a way as to be exposed on the pair of flange portions 52.

As described above, the driver module 37 and the power module 34, in that order, are assembled with the housing 39 through the opening portion at the one end (on the side face of which the heat sink 38 is mounted) of the housing 39; the heat sink 38 is mounted in such a way as to cover the opening portion at the one end of the housing 39; then, the power module 34 is mounted on the heat sink 38. As a result, the driver module 37 and the power module 34 are contained in the housing 39.

Then, after electric connection between the positive, negative, and AC terminals 40, 41, and 42 of the power module 34 and the electric power connection members 47, electric connection between the signal terminal 46 of the driver module 37 and the signal connection member 48 thereof, and electric connection between the signal terminals 43a and 43b of the power module 34 and the signal terminals 45a and 45b of the driver module 37 are completed, the inside of the housing 39 is filled with a gel-like protection gel 55 made of silicon, an epoxy resin, or the like.

Two or more fine 56, which are parallel to the rotor shaft 10, are provided on the side face, of the heat sink 38, that is opposite to the side face thereof on which the power module 34 is mounted. As illustrated in FIGS. 1 and 2, when the power module composite 24 is mounted on the rear bracket 6, the cooling fin 56 is disposed in such a way as to face inward with respect to the center of the rotor shaft 10. The heat sink 38 in Embodiment 1 is made of an aluminum drawing material.

The electric rotating machine 1, configured as described above, according to Embodiment 1 of the present invention has the functions of a motor and an electric power generator; at first, the operation of the electric rotating machine 1, as a motor, will be explained. When the engine is started, the battery supplies DC power to the power module composite 24. The control circuit unit 26 performs On/OFF-control of the switching devices 32 of the power module composite 24; a DC current inputted, from the battery to the power module composite 24 is converted into a three-phase AC current and is supplied to the stator winding 23.

A rotating magnetic field is generated around the rotor winding 20 to which a current corresponding to a control signal inputted from the control circuit unit 26, so that the rotor 11 is rotated. The torque of the rotor 11 is transferred from the pulley 14 to the engine through the communication belt, so that the engine is started.

Next, the operation of the electric rotating machine 1, as an electric power generator, will be explained. After the engine has been started, the torque of the engine is transferred to the rotor shaft 10, through the rotor shaft of the engine, the communication belt, and the pulley 14. As a result, the rotor 11 is rotated and a three-phase AC voltage is induced across the stator winding 23. Then, the control circuit unit 26 performs ON/OFF-control of the switching device 32 of the power module composite 24 so as to convert the three-phase AC power induced across the stator winding 23 into DC power; the DC power charges the battery.

While the rotor 11 rotates, the centrifugal fans 15 and 16 rotate in conjunction with the rotation of the rotor 11. At the front bracket 5, air is taken in by the front bracket through the air inlet 5a, flows in the axis direction of the rotor shaft. 10 and reaches the rotor 11, and then is bent in the centrifugal direction by the centrifugal fan 15. The air bent in the centrifugal direction cools the coil end of the stator winding 23 and then is exhausted to the outside of the front bracket, through the air outlet 5b.

Meanwhile, at the rear bracket 6, air is taken in by the rear bracket 6 through the air inlet 6a, flows in the axis direction of the rotor shaft 10 and reaches the rotor 11, and then is bent in the centrifugal direction by the centrifugal fan 16. The air bent in the centrifugal direction cools the coil end of the stator winding 23 and then is exhausted to the outside of the rear bracket 6, through the air outlet. 6b.

The air taken in at the rear bracket 6 passed by the cooling fin 56 formed in the heat sink 38 of the power module composite 24 before it is taken in through the air inlet 6a; therefore, the switching device 32 and the like are cooled in a similar manner.

In the electric rotating machine 1 configured as described above, the switching devices included in the inverter circuit of the power module 34 are molded with the insulating resin 33, and the integrated circuit 35 of the driver module 37 is molded; therefore, the wire bonding portion is not broken when the electric rotating machine 1 is operated and hence the vibration resistance of the power module composite 24 is raised. Moreover, in Embodiment 1, the soldering portions of the switching devices 32 and the integrated circuit 35 are protected by molding; therefore, the vibration resistance is further raised and hence the reliability of the power module composite 24 is enhanced.

The power module 34 and the driver module 37 are mounted in that order on the heat sink 38 and they are all contained in the housing 39; thus, in comparison with the case where the power module 34 included in the electric-power conversion circuit such as an inverter and the driver module 37 including the integrated circuit 35 are arranged on a plane, the mounting area can be reduced; therefore, the power module composite 24 can be downsized.

Furthermore, the switching devices 32 and the integrated circuit. 35 are molded with the insulating resin 33 and the insulating resin 36, respectively; therefore, through an operation check after the molding, a failure in the electric connection portion such as the wire bonding portion or the soldering portion can be detected. Accordingly, in comparison with the case where the switching devices 32 and the integrated circuit 35 are mounted in the housing 39 and are electrically connected and where an operation check of the whole power module composite 24 is performed, the disposal of the components can be reduced as much as possible and hence the productivity of the whole power module composite 24 is raised.

Because the power module 34 and the driver module 37 are arranged in such a way as to superimpose each other, the distance between the inverter circuit of the power module 34 and the integrated, circuit 35 of the driver module 37 can be shortened; thus, because the length of the wiring lead required to electrically connects these circuits can be reduced, a malfunction caused by electromagnetic noise can be prevented.

In Embodiment 1, two respective inverter circuits provided in the two power modules 34 are controlled by a single integrated circuit 35; thus, in comparison with the case where two or more inverter circuits are controlled by two or more integrated circuits, the number of external wiring leads that are pulled out from the driver module 37 provided with the integrated circuit 35 can largely be reduced; therefore, the productivities of the control apparatus 3 and the electric rotating machine 1 are raised.

In Embodiment 1, the signal terminals 43*a* and 43*b* of the power module 34 and the signal terminals 45*a* and 45*b* of the driver module 37 are pulled out from the respective one side faces, of the approximately quadrangular insulating resins 33 and 36, that are oriented to the same direction, and the power-source terminals including the positive and negative terminals 40 and 41 and the AC terminal 42 are pulled out from the side face that is opposed to the side face of the insulating resin. 33, from which the signal terminal 43 is pulled out. As a result, the electric connection between the signal terminals 43*a* and 43*b* and the signal terminals 45*a* and 45*b* can readily be implemented, and the signal terminals 43*a* and 43*b* and the signal terminals 45*a* and 45*b* do not interfere with the electric connection between the positive, negative, and AC terminals 40, 41, and 42 and the electric power connection members 47; therefore, the electric connections can readily be implemented.

The positive, negative, and AC terminals 40, 41, and 42 and the signal terminals 43*a* and 43*b* are pulled out from the respective side faces, of the insulating resin 33, that are opposed to each other; therefore, the method for electric connection of the signal terminals 43*a* and 43*b*, whose current capacities are small, and the method for electric connection of the positive, negative, and AC terminals 40, 41, and 42, whose current capacities are large, can be made to differ from each other. For example, it is made possible that while soldering connection is applied to the signal terminals 42*a* and 43*b*, robust connection through laser welding or the like is applied to the positive, negative, and AC terminals 40, 41, and 42.

In Embodiment 1, the positive, negative, and AC terminals 40, 41, and 42 and the signal terminals 43*a* and 43*b* are pulled out from the respective side faces, of the insulating resin 33, that are opposed to each other; however, the present invention is not limited thereto, and it is only required that the positive, negative, and AC terminals 40, 41, and 42 and the signal terminals 43*a* and 43*b* are pulled out from the respective side faces, of the insulating resin 33, that are different from each other.

Moreover, because the inside of the housing 39 is filled with the gel-like protection gel 55 made of silicon, an epoxy resin, or the like, the positive, negative, AC, and signal terminals 40, 41, 42, and 43*a* and 43*b* of the power module 34 and the signal terminals 45*a*, 45*b*, and 46 of the driver module 37 are protected by the protection gel 55; therefore, in comparison with the case where nothing is filled into the inside of the housing 39, the insulating performances among the terminals are raised. As a result, fine-pitch arrangement of the terminals can be implemented, and hence the power module 34 and the driver module 37, i.e., the power module composite 24 can be downsized. The protection gel 55 only needs to be gel-like and is not limited to silicon or an epoxy resin.

In addition, when viewed from a direction in which the driver module 37 is superimposed on the power module 34, the electric power connection members 47 are disposed at positions where the positive terminals 40, the negative terminals 41, and the AC terminals 42 of the power module 34 are superimposed on the electric power connection members 47, and the signal connection members 48 are disposed at positions where the signal terminals 43*a*, 43*b*, 45*a*, 45*h*, and 46 are superimposed on the signal connection members 48. As a result, the distances, required for electric connection, between the positive, negative, and AC terminals 42 and the electric power connection members 47 can be shortened, and the distances, required for electric connection, between the signal terminals 43*a*, 43*b*, 45*a*, 45*b*, and 46 and the signal connection members 48 can also be shortened; therefore, the power module composite 24 can be downsized.

The connection portions 51 provided at the front ends of the signal connection members 48 electrically connected with the respective signal terminals 45 of the driver module 37 are pulled out aligned in a straight line from the insulating resin 49 included in the housing 39 and are provided in a direction along the rotor shaft. 10; thus, the electric connection with the signal relay member 30 and the connection portion 51 is readily implemented, and hence the shape and the structure of the signal relay member 30 can be simplified.

Moreover, the flange 52 for mounting the power module composite 24 on the rear bracket 6 is formed in the housing 39; thus, the power module composite 24 can readily be fixed thereto.

The connection portion 53 and a connection portion 54, which are the respective ends of the electric power connection members 47 pulled out toward the outside of the housing 39 and have the same electric potential as the battery and the same electric potential as the ground, respectively, are formed in such a way as to be exposed on the pair of flange portions 52; therefore, when the power module composite 24 is fixed to the rear bracket 6 and an external apparatus, the electric connections can concurrently be performed; thus, the productivity of the electric rotating machine 1 is raised, and the electric rotation machine 1 can be downsized, in comparison with the case where the electric connection is performed at a position other than the flange portion 52. In addition, because the flange portion 52 has a mounting face 52a perpendicular to the rotor shaft. 10, the housing 39 and the rear bracket 6 can be fastened with each other by use of a screw or the like, along the axis direction of the rotor shaft 10; thus, the productivity of the electric rotating machine 1 is raised.

Furthermore, the cooling fin 56 parallel to the rotor shaft 10 is provided in the heat sink 38, and the cooling fin 56 is disposed in such a way that when the power module composite 24 is mounted on the rear bracket 6, the cooling fin 56 faces inward with respect to the center of the rotor shaft 10; thus, because there is formed an air duct for cooling air taken in by the centrifugal fan 16 passes through the cooling fins 56 of the heat sink 38, the cooling efficiency is raised; therefore, the reliability of the power module composite 24 is further enhanced. In addition, because the cooling fin 56 is provided on the side face, of the heat sink 38, that is opposed to the side face thereof on which the power module 34 is mounted, the driver module 37 is superimposed on the power module 34 outward in the radial direction of the rotor shaft 10; therefore, in comparison with the case where the power module 34 and the driver module 37 are arranged on the same plane, the total length of the electric rotating machine 1 can be shortened; thus, the vehicle mountability of the electric rotating machine 1 in the engine room is raised.

Furthermore, the electric power connection member 47 of the housing 39, electrically connected with the AC terminal 42 of the power module 34 is disposed on the side face, in the housing 39, that is opposed to the side face on which the heat sink 38 is mounted; thus, because when the power module composite 24 is mounted on the rear bracket 6, the electric power connection member 47 is disposed outward in the radial direction of the rotor shaft 10, the distance between the rotor winding 20 and the electric power connection member 47 can be decreased; therefore, the electric connection between the electric power connection members 47 and the rotor winding 20 is readily performed and hence the productivity of the electric rotating machine 1 is raised.

In the driver module 37 of Embodiment 1, because the integrated circuit 35 is mounted on the glass epoxy substrate 44, which is a multi-layer substrate, the arrangement of the terminals can freely be set; thus, the flexibility of the design is raised. The substrate 44 is not limited to a glass-epoxy substrate and may be any one of other multi-layer substrates; however, because it is inexpensive in comparison with a ceramic substrate, a glass-epoxy substrate can reduce the costs. Moreover, packaging with the insulating resin 36 makes it possible to suppress the substrate 44 from thermally expanding toward the outside thereof; therefore, the stress exerted on the soldering portion between the through-holes of the glass-epoxy substrate 44 and the terminals of the integrated circuit 35 can be reduced.

In addition, because each of the two or more power modules 34 has an electric-power conversion circuit (a three-phase electric-power conversion circuit, in Embodiment 1) such as an inverter circuit in the insulating resin 33, the positive and negative terminals 40 and 41 can concurrently be utilized, in comparison with the case where the electric-power conversion circuit is configured with discrete components; thus, the power module composite 24 can be downsized. Because the positive and negative terminals 40 and 41 are concurrently utilized, the number of terminals pulled out from the insulating resin 33 can also be reduced; thus, the electric connection between the electric power connection members 47 and the foregoing terminals is readily performed and hence the productivity of the power module composite 24 is enhanced.

In addition, because it is made of an aluminum drawing material, the heat sink 38 is inexpensive in comparison with the case where it is produced through casting; thus, the costs can be reduced. Furthermore, in the case where the heat sink 38 has the cooling fins 56, the gap between the cooling fins 56 can be decreased; thus, the designing flexibility increases and the coolability of the power module composite 24 can be raised.

Embodiment 2

Figure 9:
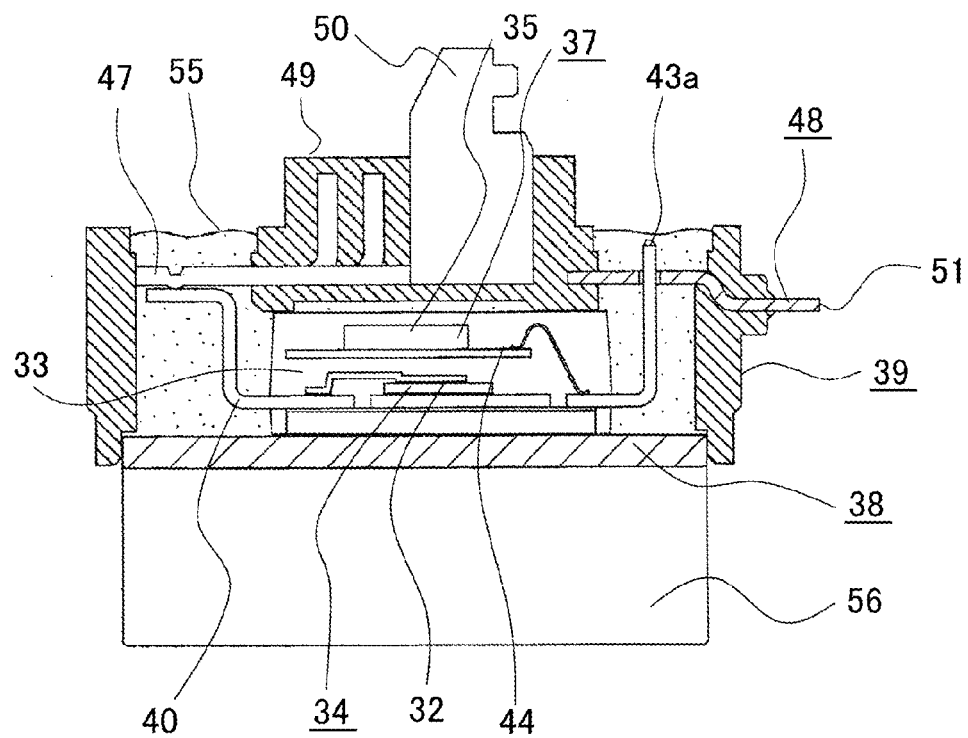
FIG. 9 is a cross-sectional view of a power module composite in the electric rotating machine according to Embodiment 2 of the present invention.

Next, an electric rotating machine according to Embodiment 2 of the present invention will be explained. FIG. 9 is a cross-sectional view of a power module composite in an electric rotating machine according to Embodiment 2 of the present invention. In Embodiment 1, the electric-power conversion circuit configured with switching devices 32 and the integrated circuit 35 for controlling the electric-power conversion circuit are separately molded so as to form the power module 34 and the driver module 37, respectively, and are separately contained in the housing 39; however, in Embodiment 2, as illustrated in FIG. 9, the inverter circuit configured with the switching devices 32 and the integrated circuit 35 that controls the inverter circuit and is superimposed on the inverter circuit are integrally molded with the insulating resin 33 and then are contained in the housing 39. The other configurations are the same as those in Embodiment 1.

In the electric rotating machine 1, configured as described above, according to Embodiment 2 of the present invention, the switching devices included in the electric-power conversion circuit of the power module 34 are molded with the insulating resin 33, and the integrated circuit 35 of the driver module 37 is also molded with the insulating resin 33; therefore, because the wire bonding portion is not broken when the electric rotating machine 1 is operated, the vibration resistance of the power module composite 24 is raised and hence the reliability is enhanced. In addition, in Embodiment 2, the soldering portions of the switching devices 32 and the integrated circuit 35 are protected by molding; therefore, the vibration resistance is further raised and hence the reliability of the power module composite 24 is enhanced.

Because when the power module 34 and the driver module 37 are molded, electric connection of the signal terminals 43a, 43b, 45a, and 45b can be performed, the number of points at which electric connection is performed after the power module 34 and the driver module 37 are contained in the housing 39 can be decreased; therefore, the manufacturing man-hours for the whole power module composite 24 can be decreased. Because no manufacturing die and the like for performing molding by use of the insulating resin 36 is required, the costs can be reduced. Moreover, because the thickness-direction dimension can be reduced in comparison with the case where the power module 34 and the driver module 37 are superimposed on each other, the flexibility in the layout of components increases and the power module composite 24 can be downsized.

Embodiment 3

Figure 10:
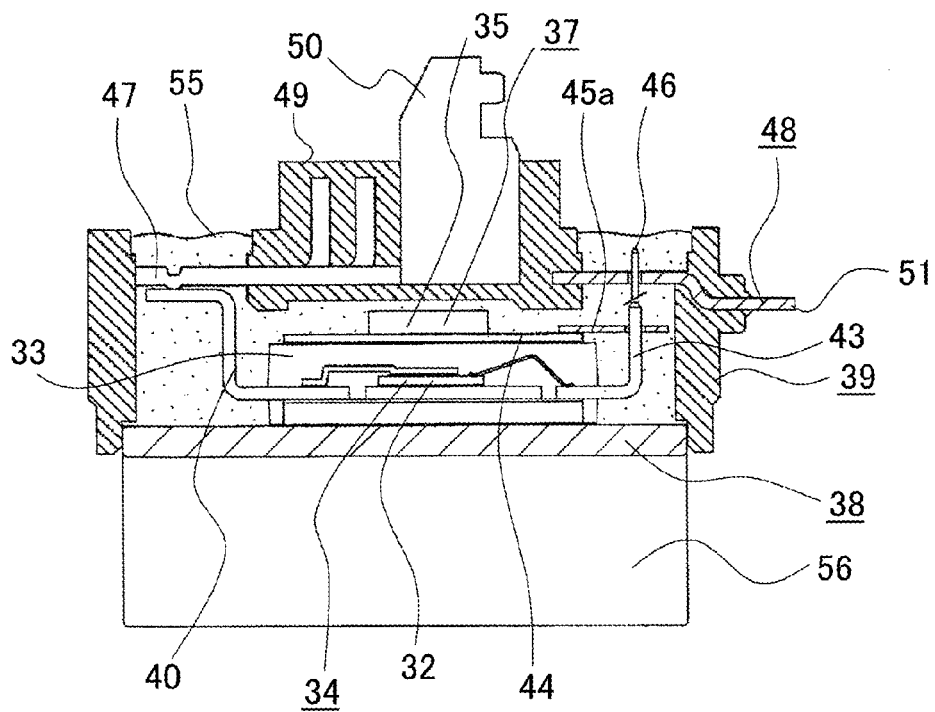
FIG. 10 is a cross-sectional view of a power module composite in the electric rotating machine according to Embodiment 3 of the present invention.

Next, an electric rotating machine according to Embodiment 3 of the present invention will be explained. FIG. 10 is a cross-sectional view of a power module composite in an electric rotating machine according to Embodiment 3 of the present invention. Embodiment 1 is a case where the integrated circuit 35 molded with an insulating resin 35 is further molded with the insulating resin 36; Embodiment 2 is a case where the integrated circuit 35 molded with an insulating resin 35 is further molded with the insulating resin 33; however, in Embodiment 3, as illustrated in FIG. 10, the integrated circuit 35 molded with an insulating resin is mounted on a substrate 44 and the substrate 44 is placed on the insulating resin 33 of the power module 34. The other configurations are the same as those in each of Embodiments 1 and 2.

In the electric rotating machine according to Embodiment 3, the switching devices included in the inverter circuit of the power module 34 are molded with the insulating resin 33, and the integrated circuit 35 is also molded; therefore, the wire bonding portion is not broken when the electric rotating machine 1 is operated and hence the vibration resistance of the power module composite 24 is raised.

Furthermore, because the switching devices 32 and the integrated circuit 35 are separately molded, a failure in each of the electric connection portions (such as the wire bonding portion and the soldering portion) can be detected through an operation check after the molding; therefore, the disposal of the components can be reduced as much as possible and hence the productivity of the whole power module composite 24 is raised. In addition, because the thickness-direction dimension can further be reduced in comparison with the structure of the power module composite 24 according to Embodiment 2, the flexibility in the layout of components further increases and the power module composite 24 can further be downsized.

In each of Embodiments 1 through 3, the switching device 32 has been explained as an MOSFET; however, the switching device 32 is not limited thereto; for example, it may by a power transistor, an IGBT, or the like.

In each of Embodiments 1 and 2, a vehicle AC motor generator has been explained; however, the present invention is not limited thereto. In general, due to a severe usage environment, a strict vibration resistance of a vehicle electric rotating machine such as a vehicle AC generator is required, and in terms of the layout inside the engine room, the downsizing of the vehicle electric rotating machine is also strongly required; thus, the present invention can be applied to both the vehicle electric rotating machines. The present invention demonstrates the same effect even when applied to a rotating electric machine such as an AC motor generator or an AC generator for other applications.

In the scope of the present invention, the embodiments thereof can appropriately be modified or omitted.

INDUSTRIAL APPLICABILITY

The present invention can be applied to the field of an electric rotating machine, especially to the field of an electric rotating machine such as a motor generator, mounted in an automobile or the like, that starts an internal combustion engine or is driven by the internal combustion engine so as to generate electricity.

DESCRIPTION OF REFERENCE NUMERALS

1: electric rotating machine
3: control apparatus
6a: air inlet
7: case
10: rotor shaft
11: rotor
12: stator
16: centrifugal fan
23: stator winding
24: power module composite
32: switching device
33, 36: insulating resin
34: power module
35: integrated circuit
37: driver module
38: heat sink
39: housing
40: positive terminal
41: negative terminal
42: AC terminal
43: signal terminal
44: substrate
45: signal terminal
46: signal terminal
47: electric power connection member
48: signal connection member
52: flange portion
52a: mounting face
53, 54: connection portion
55: protection gel
56: cooling fin

The invention claimed is:

1. An electric rotating machine comprising:
a rotor fixed on a rotor shaft;
a stator that is disposed to face the rotor and is provided with a stator winding;
a case that pivotably supports the rotor shaft and holds the stator; and
a control apparatus that is fixed to the case and includes:
a power module composite provided with an electric-power conversion circuit that performs electric-power conversion between the stator winding and an external DC power source, and
a control unit that controls the power module composite so that the electric-power conversion circuit converts a DC power from the external DC power source into AC power and supply the AC power to the stator winding or converts the AC power generated across the stator winding into the DC power and supply the DC power to the external DC power source,
wherein the power module composite includes:
a power module in which switching devices included in the electric-power conversion circuit are molded with a first insulating resin,
a driver module that includes a control circuit for controlling the switching devices and is molded with a second insulating resin separately from the power module, to form a separate module,
a housing containing the power module and the driver module, and a heat sink that is mounted in the housing and cools the switching devices, wherein the power module and the driver module are mounted on the heat sink in such a way that the driver module is superimposed on the power module that is closer to the heat sink than the driver module is, wherein power-module signal terminals of the power module and driver-module signal terminals of the driver module are pulled out from first side faces, of the first insulating resin and the second insulating resin, respectively, that correspond to each other and are arranged in the same manner, and wherein negative terminals, positive terminals, and power-source terminals of the power module are pulled out from a second side race of the first insulating resin that is different from the first side face of the first insulating resin.

2. The electric rotating machine according to claim 1, wherein
the housing includes electric power connection members for pulling out the power-source terminals from the power module composite to the outside and signal connection members for pulling out the driver-module signal terminals from the power module composite to the outside.

3. The electric rotating machine according to claim 2, wherein the inside of the housing is filled with a protection gel.

4. The electric rotating machine according to claim 2, wherein the electric power connection members are arranged at positions where the electric power connection members overlap the power-source terminals and the signal connection members are arranged at positions where the signal connection members overlap the power-module signal terminals and the driver-module signal terminals.

5. The electric rotating machine according to claim 2, wherein the signal connection members pulled out from the power module composite to the outside are arranged in the housing in such a way as to be aligned in a straight-line manner along the rotor shaft.

6. The electric rotating machine according to claim 2, wherein the housing is provided with a flange portion for mounting the power module composite on the case.

7. The electric rotating machine according to claim 6, wherein the flange portion has connection portions that are electrically connected with the electric power connection members and have respective electric potentials, one of which is the same as an electric potential of the external DC power source and the other one of which is the same as a ground potential.

8. The electric rotating machine according to claim 6, wherein the flange portion has a mounting face perpendicular to the rotor shaft.

9. The electric rotating machine according to claim 2, further including a centrifugal fan provided at an axis-direction end of the rotor, an air inlet that is provided at one end of the case and through which the centrifugal fan takes in cooling air, and a cooling fin provided in the heat sink in such a way as to face inward with respect to the rotor shaft and to be parallel to the rotor shaft.

10. The electric rotating machine according to claim 9, wherein the cooling fin is provided on a side face, of the heat sink, that is opposed to other side face thereof on which the power module is mounted.

11. The electric rotating machine according to claim 10, wherein one of the electric power connection members connected with a stator winding connection terminal is provided on a side face, of the case, that is opposed to other side face thereof on which the heat sink is mounted.

12. The electric rotating machine according to claim 2, wherein the power module is provided with all of the switching devices included in the electric-power conversion circuit.

13. The electric rotating machine according to claim 1, wherein the control circuit is mounted on a substrate and the substrate is placed on a top of the power module.

14. The electric rotating machine according to claim 1, wherein the control circuit is mounted on a multi-layer substrate and the control circuit and the multi-layer substrate are integrally molded.

15. The electric rotating machine according to claim 14, wherein the multi-layer substrate is a glass-epoxy substrate.

16. The electric rotating machine according to claim 1, wherein the heat sink is formed of a drawing material.

17. The electric rotating machine according to claim 1, wherein the electric rotating machine is a vehicle electric rotating machine.

* * * * *